US011889503B2

(12) United States Patent
Pezeshki et al.

(10) Patent No.: US 11,889,503 B2
(45) Date of Patent: Jan. 30, 2024

(54) UE FEEDBACK OF NON-PREFERRED TIME-FREQUENCY RESOURCES

(71) Applicant: QUALCOMM Incorporated, San Diego, CA (US)

(72) Inventors: Hamed Pezeshki, San Diego, CA (US); Tao Luo, San Diego, CA (US); Sony Akkarakaran, Poway, CA (US); Hua Wang, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 17/214,720

(22) Filed: Mar. 26, 2021

(65) Prior Publication Data

US 2022/0312399 A1 Sep. 29, 2022

(51) Int. Cl.
*H04W 72/04* (2023.01)
*H04W 72/12* (2023.01)
*H04W 48/02* (2009.01)
*H04W 72/08* (2009.01)
*G06N 20/00* (2019.01)
*H04W 72/20* (2023.01)
*H04W 72/542* (2023.01)
*H04W 72/044* (2023.01)

(52) U.S. Cl.
CPC ............ *H04W 72/20* (2023.01); *G06N 20/00* (2019.01); *H04W 48/02* (2013.01); *H04W 72/542* (2023.01); *H04W 72/044* (2013.01)

(58) Field of Classification Search
CPC ............ H04W 72/0406; H04W 48/02; H04W 72/085; H04W 72/1278; H04W 72/044; G06N 20/00
See application file for complete search history.

(56) References Cited

U.S. PATENT DOCUMENTS

2009/0245190 A1* 10/2009 Higuchi ............ H04W 72/1231
370/329
2013/0094387 A1* 4/2013 Susitaival ........... H04W 72/082
370/252

(Continued)

FOREIGN PATENT DOCUMENTS

EP 2131624 A1 12/2009

OTHER PUBLICATIONS

Apple: "Views on Work Scope of Rel-17 NR Sidelink Enhancement", 3GPP TSG RAN Meeting #91 e, RP-210501, 3GPP, Mobile Competence Centre, 650, Route Des Lucioles, F-06921, Sophia-Antipolis Cedex, vol. TSG RAN No. Electronic Meeting, Mar. 16-Mar. 26, 2021, Mar. 15, 2021, XP051985860, pp. 1-3.

(Continued)

*Primary Examiner* — Awet Haile
(74) *Attorney, Agent, or Firm* — Procopio, Cory, Hargreaves & Savitch LLP/QUALCOMM Incorporated

(57) ABSTRACT

This disclosure provides systems, devices, apparatus, and methods, including computer programs encoded on storage media, for UE feedback of non-preferred time-frequency resources. The UE may receive, from a base station over time, a plurality of DL transmissions for which the UE may perform measurements on the plurality of DL transmissions. Based at least in part on the measurements, the UE may transmit, to the base station, an indication of a set of one or more time-frequency resources to avoid using for communications with the UE.

64 Claims, 9 Drawing Sheets

(56) References Cited

U.S. PATENT DOCUMENTS

| | | | | |
|---|---|---|---|---|
| 2014/0313908 | A1* | 10/2014 | da Silva | H04W 72/042 |
| | | | | 370/252 |
| 2016/0142187 | A1* | 5/2016 | Yang | H04L 5/0046 |
| | | | | 370/328 |
| 2017/0142733 | A1* | 5/2017 | Wang | H04L 1/0015 |
| 2019/0260447 | A1* | 8/2019 | Nam | H04L 5/0048 |
| 2019/0313394 | A1* | 10/2019 | Kubota | H04W 72/0453 |
| 2021/0029705 | A1 | 1/2021 | Zhou et al. | |
| 2021/0064996 | A1* | 3/2021 | Wang | H04L 5/0051 |
| 2022/0030647 | A1* | 1/2022 | Lee | H04W 72/06 |
| 2022/0046594 | A1* | 2/2022 | Lee | H04L 5/0044 |
| 2022/0095240 | A1* | 3/2022 | Ying | H04W 52/243 |
| 2022/0182160 | A1* | 6/2022 | Su | H04B 17/309 |

OTHER PUBLICATIONS

ETRI: "Further Discussion on Reliability Issue of UE Indication", 3GPP TSG-RAN WG2 Meeting #96, R2-167912—further Discussion on Reliability Issue of UE Indication, 3GPP, Mobile Competence Centre, 650, Route Des Lucioles, F-06921, Sophia-Antipolis Cedex, vol. RAN WG2 No. Reno, USA, Nov. 14-Nov. 18, 2016, Nov. 4, 2016, XP051192307, 5 Pages.

International Search Report and Written Opinion—PCT/US2022/018546—ISA/EPO—dated Oct. 7, 2022 (2100127WO).

Samsung: "UL Inter-UE Multiplexing/Prioritization", 3GPP TSG RAN WG1 #97, R1-1906959, EURLLC UL CI_PI, 3GPP, Mobile Competence Centre, 650, Route Des Lucioles, F-06921, Sophia-Antipolis Cedex, France, vol. RAN WG1, No. Reno, USA, May 13-May 17, 2019, May 3, 2019, XP051708994, pp. 1-5.

\* cited by examiner

UE FEEDBACK OF NON-PREFERRED TIME-FREQUENCY RESOURCES

INTRODUCTION

The present disclosure relates generally to communication systems, and more particularly, to machine learning-based resource determinations.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method of wireless communication at a user equipment (UE) is provided. The method may include receiving, from a base station over time, a plurality of DL transmissions; and transmitting, to the base station, an indication of a set of one or more time-frequency resources to refrain from using for communication with the UE, the indication of the set of one or more time-frequency resources based at least in part on measurements performed on the plurality of DL transmissions.

In another aspect of the disclosure, an apparatus for wireless communication is provided. The apparatus may be a UE that includes a memory and at least one processor coupled to the memory, the memory and the at least one processor configured to receive, from a base station over time, a plurality of downlink (DL) transmissions; and transmit, to the base station, an indication of a set of one or more time-frequency resources to refrain from using for communication with a UE, the indication of the set of one or more time-frequency resources based at least in part on measurements performed on the plurality of DL transmissions.

In another aspect of the disclosure, an apparatus for wireless communication at a UE is provided. The apparatus may include means for receiving, from a base station over time, a plurality of DL transmissions; and means for transmitting, to the base station, an indication of a set of one or more time-frequency resources to refrain from using for communication with the UE, the indication of the set of one or more time-frequency resources based at least in part on measurements performed on the plurality of DL transmissions.

In another aspect of the disclosure, a non-transitory computer-readable storage medium storing computer executable code for wireless communication at a UE is provided. The code when executed by a processor cause the processor to receive, from a base station over time, a plurality of DL transmissions and transmit, to the base station, an indication of a set of one or more time-frequency resources to refrain from using for communication with a UE, the indication of the set of one or more time-frequency resources based at least in part on measurements performed on the plurality of DL transmissions.

In an aspect of the disclosure, a method of wireless communication at a base station is provided. The method may include transmitting, to a UE over time, a plurality of DL transmissions; and receiving, from the UE, an indication of a set of one or more time-frequency resources to refrain from using for communication with the UE.

In another aspect of the disclosure, an apparatus for wireless communication is provided. The apparatus may be a base station that includes a memory and at least one processor coupled to the memory, the memory and the at least one processor configured to transmit, to a UE over time, a plurality of DL transmissions; and receive, from the UE, an indication of a set of one or more time-frequency resources to refrain from using for communication with the UE.

In another aspect of the disclosure, an apparatus for wireless communication at a base station is provided. The apparatus may include means for transmitting, to a UE over time, a plurality of DL transmissions; and means for receiving, from the UE, an indication of a set of one or more time-frequency resources to refrain from using for communication with the UE.

In another aspect of the disclosure, a non-transitory computer-readable storage medium storing computer executable code for wireless communication at a base station is provided. The code when executed by a processor cause the processor to transmit, to a UE over time, a plurality of DL transmissions; and receive, from the UE, an indication of a set of one or more time-frequency resources to refrain from using for communication with the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
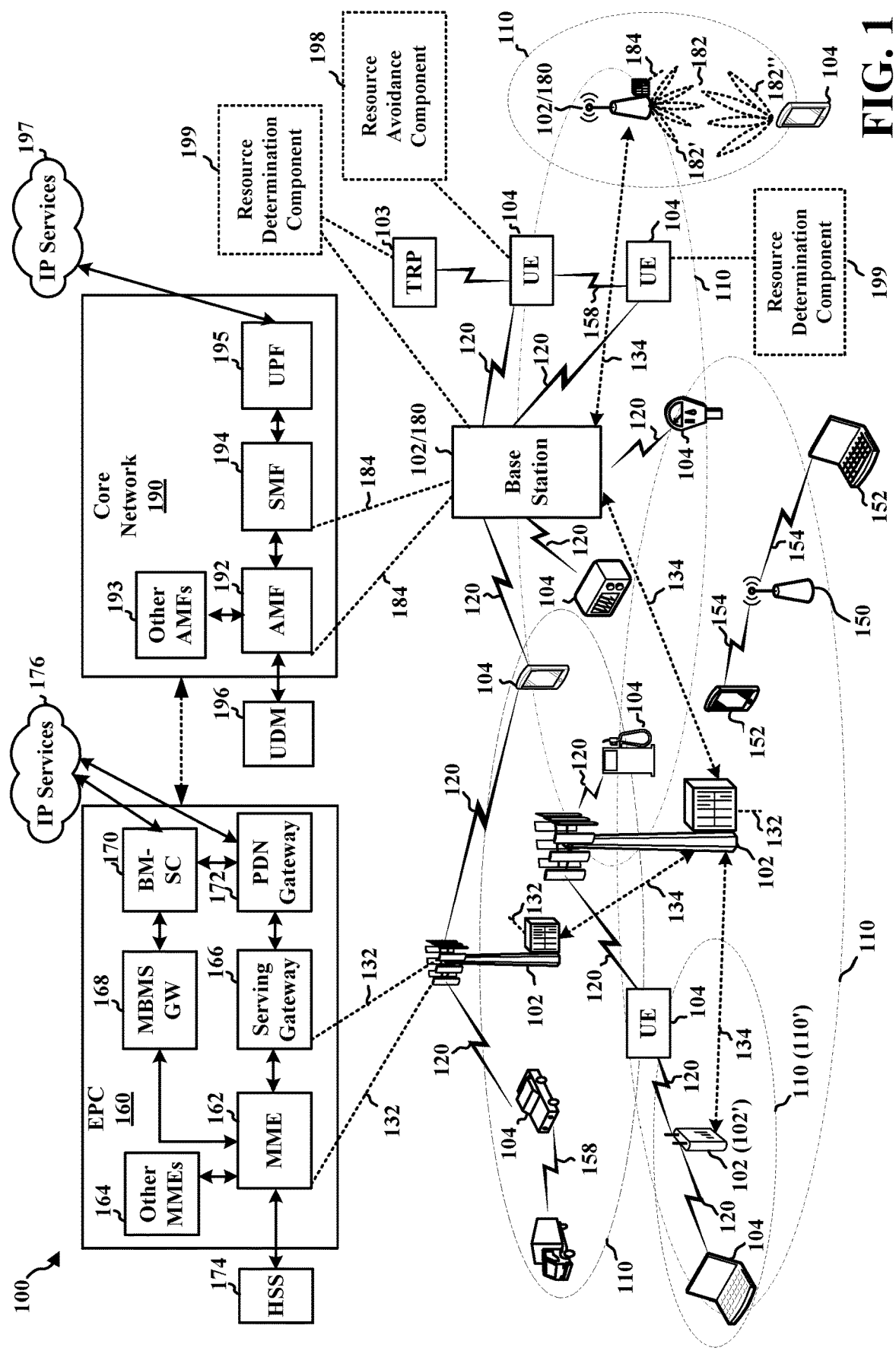
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In a wireless communication environment, a set of resources may be allocated for uplink (UL) and/or downlink (DL) transmissions between a user equipment (UE) and a base station. For some deployment environments of the UE, the allocated resources may result in interference at the UE (e.g., cell-edge deployment environments where time-frequency resources may overlap with transmissions scheduled in a neighboring cell). As presented herein, over time the UE, may utilize a neural network to learn the time-frequency resources to be avoided for improved communication with the UE, e.g., in various deployment environments. The UE may feedback information indicative of the learned time-frequency resources to the base station, which may use the information for determining resources on which to schedule transmissions, e.g., such as downlink transmissions for reception at the UE.

Based on a measured interference level, the UE may request/signal the base station to refrain from sending control information and/or data on a set of time-frequency resources determined by the UE to be non-preferred resources. For example, a machine learning algorithm may be executed by the UE to learn the time-frequency resources associated with the interference at the UE. While wideband/subband channel quality indicator (CQI) reporting techniques may be utilized by the UE to feedback a CQI to the base station, such reporting techniques may not explicitly avoid certain resources that cause interference at the UE. For instance, in one example, a subband may include a number of consecutive resource blocks (RBs) in a frequency domain (e.g., a set of 4 consecutive RBs). If subband 1 corresponds to RBs 1-4 and the UE signals the base station to refrain from transmitting on RBs 3-6, the RBs signaled by the UE may be located in two different subbands (e.g., subband 1 and subband 2), such that the base station may refrain from transmitting on either of the two different subbands.

As presented herein, the UE may request/signal to the base station to refrain from sending control information and/or data to the UE on the set of time-frequency resources based on an increased granularity, which may reduce resource waste via a more precise indication of the non-preferred resources. That is, the UE may be configured to signal non-preferred RBs or non-preferred resource elements (REs) to the base station. A decreased number of resources may be wasted when the UE signals non-preferred RBs than when the UE signals non-preferred subbands, and an even lesser number of resources may be wasted when the UE signals non-preferred REs than when the UE signals non-preferred RBs, if the base station determines to comply with the request received from the UE to refrain from communicating with the UE on the non-preferred resources. For instance, the UE may indicate individual (non-consecutive) RBs or (non-consecutive) REs for the base station to refrain from utilizing, rather than the base station refraining from utilizing an entire subband (e.g., corresponding to a consecutive set of RBs). Accordingly, based on the above example, if subband 1 corresponds to RBs 1-4 and subband 2 corresponds to RBs 5-8 and the UE signals the base station to refrain from transmitting on RBs 3-6, the remaining RBs in subband 1 and subband 2 may be used, and thus not wasted. A similar procedure may be applied for REs at the tone level in regard to resource boundaries of the RB.

FIG. 1 is a diagram illustrating an example of a wireless communications system and an access network 100. In certain aspects, a UE 104 may include a resource avoidance component 198 configured to receive, from a base station over time, a plurality of DL transmissions; and transmit, to the base station, an indication of a set of one or more time-frequency resources to refrain from using for communication with the UE, the indication of the set of one or more time-frequency resources based at least in part on measurements performed on the plurality of DL transmissions. In certain aspects, the base station 180 may include a resource determination component 199 configured to transmit, to a UE over time, a plurality of DL transmissions; and receive, from the UE, an indication of a set of one or more time-frequency resources to refrain from using for communication with the UE. Although the following description may be focused on 5G NR, the concepts described herein may be applicable to other similar areas, such as LTE, LTE-A, CDMA, GSM, and other wireless technologies.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
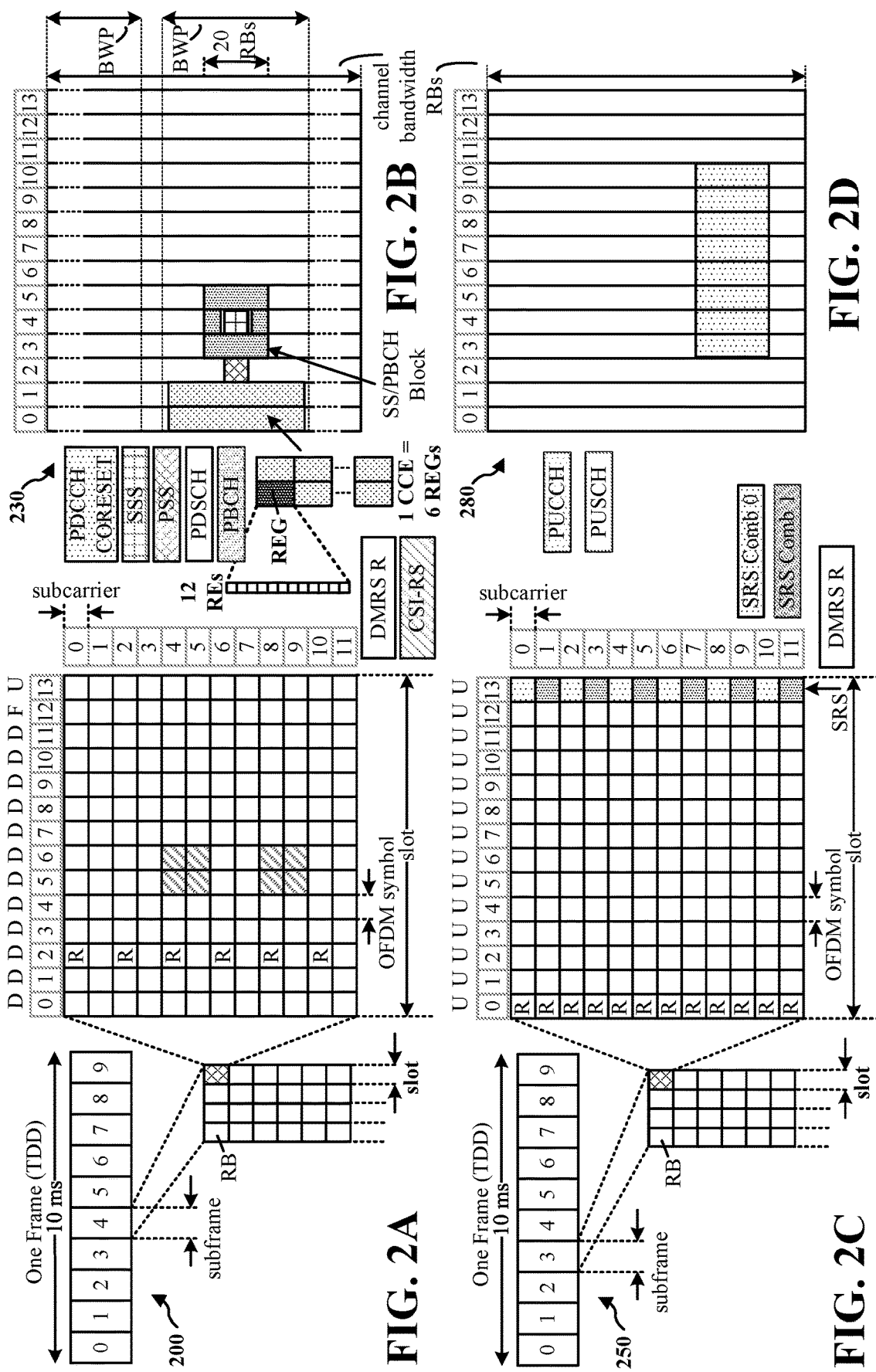
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
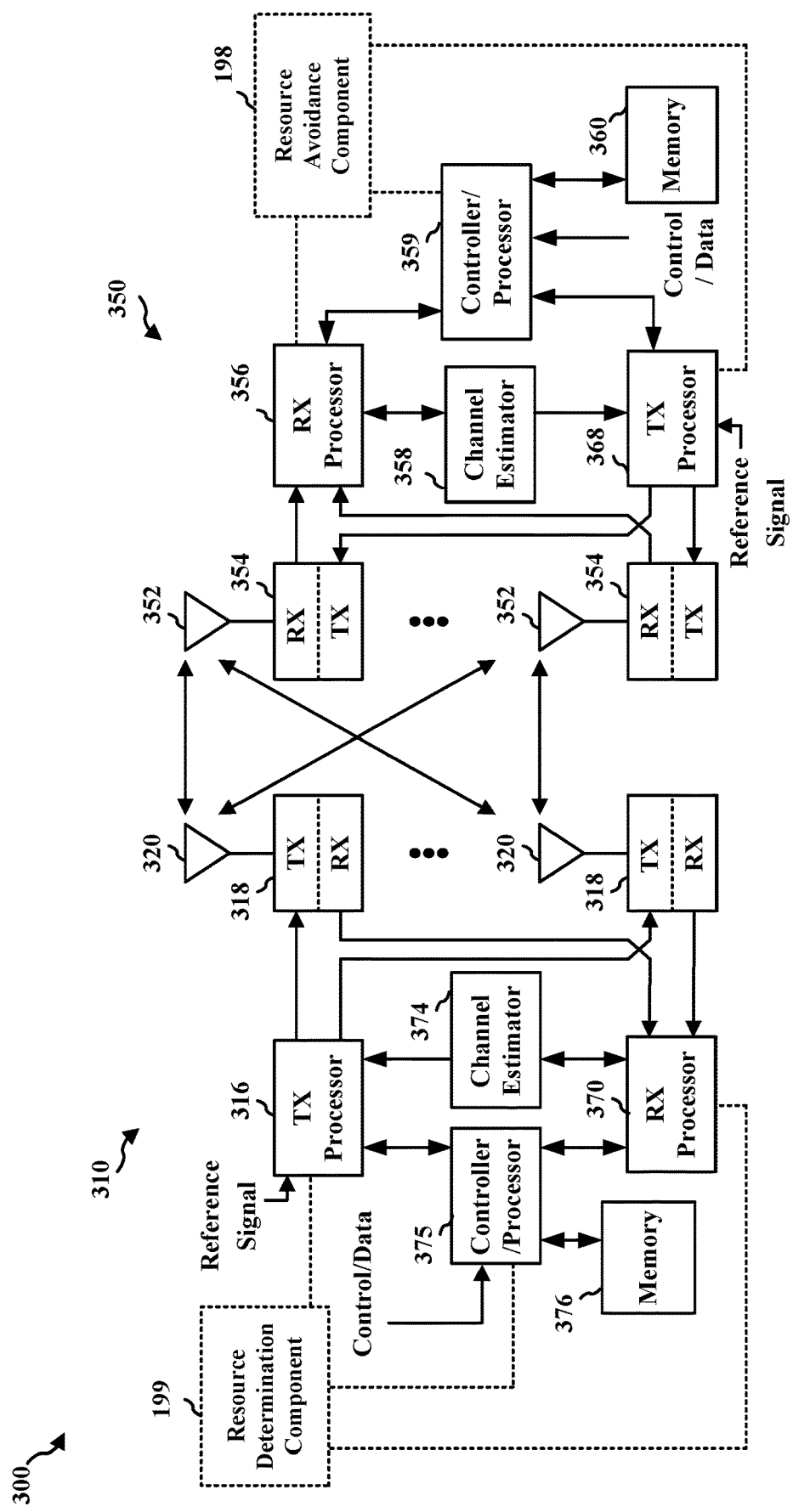
FIG. 3 is a diagram illustrating an example of a base station and user equipment (UE) in an access network.

FIG. 3 is a block diagram of two wireless devices in communication over an access link. In some aspects, the devices may correspond to a base station 310 in communication with a UE 350 in an access network. Although aspects will be described for the example of a base station 310 and a UE 350, the aspects may be similarly applied for a transmission reception point (TRP) in communication with a UE 350 or for a UE in communication with another UE. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the resource avoidance component 198 of FIG. 1.

At least one of the TX processor 316, the RX processor 370, and the controller/processor 375 may be configured to perform aspects in connection with the resource determination component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

A UE may use machine-learning algorithms, deep-learning algorithms, neural networks, or advanced signal processing methods for aspects of wireless communication, e.g., with a base station, a TRP, another UE, etc.

Figure 4:
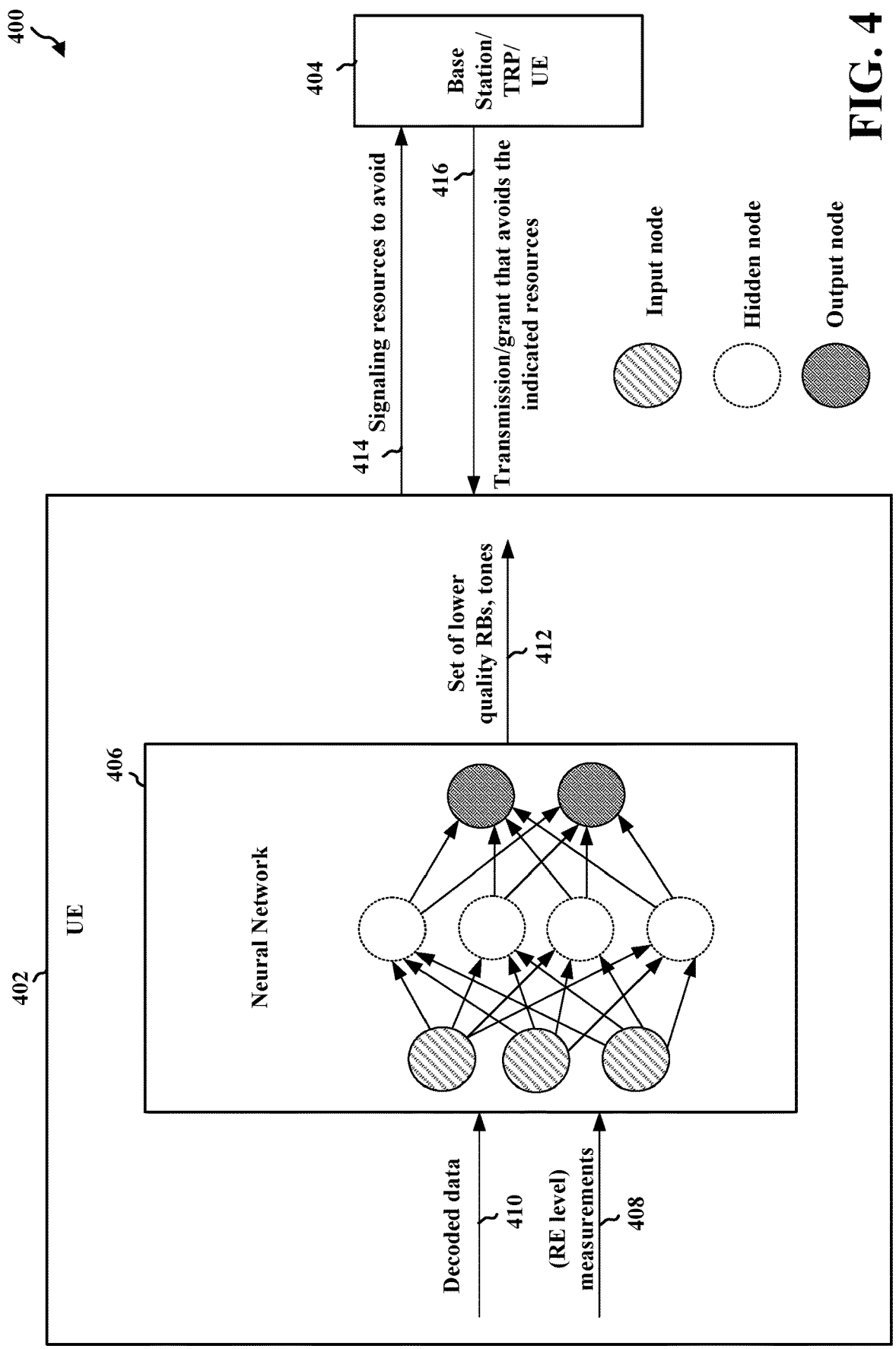
FIG. 4 is a diagram of a UE including a neural network configured to determine a set of non-preferred resources and to provide information about the set to a second wireless device for communication with the UE.

In some aspects described herein, an encoding device (e.g., a UE) may train one or more neural networks to learn dependence of measured qualities on individual parameters. FIG. 4 illustrates a diagram 400 of a UE 402 that includes a neural network 406 configured to determine a set of non-preferred resources for communication with a second device 404. The second device 404 may be a base station, in some examples. The second device 404 may be a TRP in some examples. The second device 404 may be another UE in some examples, e.g., if the communication between the UE 402 and the second device 404 is based on sidelink.

Among others, examples of machine learning models or neural networks that may be comprised in the UE 402 include artificial neural networks (ANN); decision tree learning; convolutional neural networks (CNNs); deep learning architectures in which an output of a first layer of neurons becomes an input to a second layer of neurons, and so forth; support vector machines (SVM), e.g., including a separating hyperplane (e.g., decision boundary) that categorizes data; regression analysis; bayesian networks; genetic algorithms; Deep convolutional networks (DCNs) configured with additional pooling and normalization layers; and Deep belief networks (DBNs).

A machine learning model, such as an artificial neural network (ANN), may include an interconnected group of artificial neurons (e.g., neuron models), and may be a computational device or may represent a method to be performed by a computational device. The connections of the neuron models may be modeled as weights. Machine learning models may provide predictive modeling, adaptive control, and other applications through training via a dataset. The model may be adaptive based on external or internal information that is processed by the machine learning model. Machine learning may provide non-linear statistical data model or decision making and may model complex relationships between input data and output information.

A machine learning model may include multiple layers and/or operations that may be formed by concatenation of one or more of the referenced operations. Examples of operations that may be involved include extraction of various features of data, convolution operations, fully connected operations that may be activated or deactivates, compression, decompression, quantization, flattening, etc. As used herein, a "layer" of a machine learning model may be used to denote an operation on input data. For example, a convolution layer, a fully connected layer, and/or the like may be used to refer to associated operations on data that is input into a layer. A convolution A×B operation refers to an operation that converts a number of input features A into a number of output features B. "Kernel size" may refer to a number of adjacent coefficients that are combined in a dimension. As used herein, "weight" may be used to denote one or more coefficients used in the operations in the layers for combining various rows and/or columns of input data. For example, a fully connected layer operation may have an output y that is determined based at least in part on a sum of a product of input matrix x and weights A (which may be a matrix) and bias values B (which may be a matrix). The term "weights" may be used herein to generically refer to both weights and bias values. Weights and biases are examples of parameters of a trained machine learning model. Different layers of a machine learning model may be trained separately.

Machine learning models may include a variety of connectivity patterns, e.g., including any of feed-forward networks, hierarchical layers, recurrent architectures, feedback connections, etc. The connections between layers of a neural network may be fully connected or locally connected. In a fully connected network, a neuron in a first layer may communicate its output to each neuron in a second layer, and each neuron in the second layer may receive input from every neuron in the first layer. In a locally connected network, a neuron in a first layer may be connected to a limited number of neurons in the second layer. In some aspects, a convolutional network may be locally connected and configured with shared connection strengths associated with the inputs for each neuron in the second layer. A locally connected layer of a network may be configured such that each neuron in a layer has the same, or similar, connectivity pattern, but with different connection strengths.

A machine learning model or neural network may be trained. For example, a machine learning model may be trained based on supervised learning. During training, the machine learning model may be presented with input that the model uses to compute to produce an output. The actual output may be compared to a target output, and the difference may be used to adjust parameters (such as weights and biases) of the machine learning model in order to provide an output closer to the target output. Before training, the output may be incorrect or less accurate, and an error, or difference, may be calculated between the actual output and the target output. The weights of the machine learning model may then be adjusted so that the output is more closely aligned with the target. To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error or to move the output closer to the target. This manner of adjusting the weights may be referred to as back propagation through the neural network. The process may continue until an achievable error rate stops decreasing or until the error rate has reached a target level.

The machine learning models may include computational complexity and substantial processor for training the machine learning model. FIG. 4 illustrates that an example neural network 406 may include a network of interconnected nodes. An output of one node is connected as the input to another node. Connections between nodes may be referred to as edges, and weights may be applied to the connections/edges to adjust the output from one node that is applied as input to another node. Nodes may apply thresholds in order to determine whether, or when, to provide output to a connected node. The output of each node may be calculated as a non-linear function of a sum of the inputs to the node. The neural network 406 may include any number of nodes and any type of connections between nodes. The neural network 406 may include one or more hidden nodes. Nodes may be aggregated into layers, and different layers of the neural network may perform different kinds of transformations on the input. A signal may travel from input at a first layer through the multiple layers of the neural network to output at a last layer of the neural network and may traverse layers multiple times.

Figure 5:
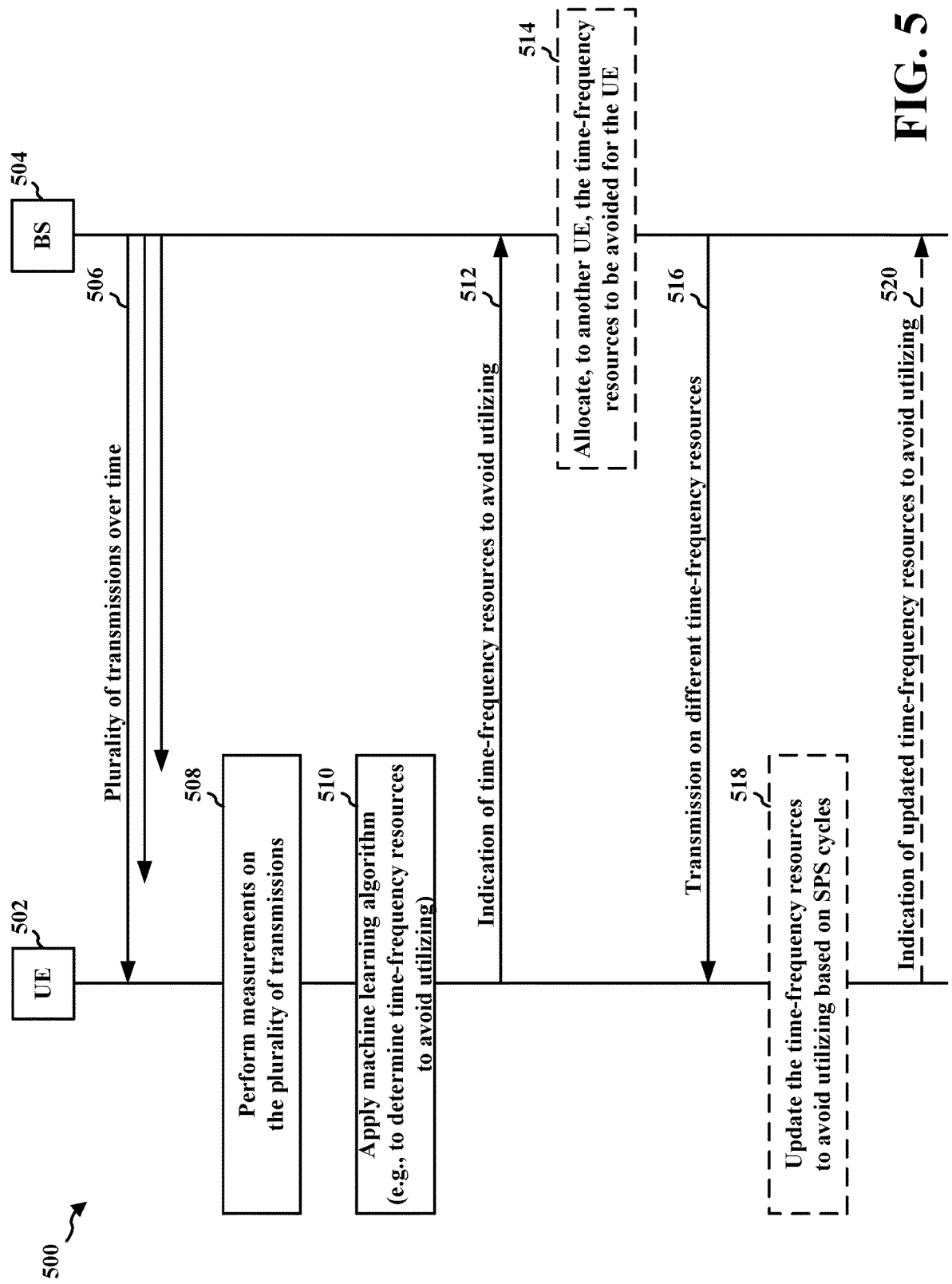
FIG. 5 is a call flow diagram illustrating communications between a UE and a base station.

FIG. 5 is a call flow diagram 500 illustrating communications between a UE 502 and a base station 504. The UE 502 may correspond to the UE 402 in FIG. 4. At 506, the UE 502 may receive a plurality of transmission over time from the base station 504. Although FIG. 5 is described in connection with a UE 502 and a base station 504 in order to illustrate the concept, the aspects may be similarly applied for a UE 502 and a TRP and/or for a UE 502 and another UE. The UE 502 may perform, at 508, measurements on the plurality of transmissions received over time, at 506, from the base station 504. The measurements preformed, at 508, may be indicative of a signal strength and/or quality associated with resources on which the plurality of transmissions were received from the base station 504.

At 510, the UE 502 may apply a machine learning algorithm, neural network, or deep learning, e.g., to determine time-frequency resources to avoid utilizing for transmissions/receptions of the UE 502. As illustrated in FIG. 4, the measurements 408 may be provided as input to the neural network 406. In some aspects, decoded data 410 may also be input to the neural network 406, e.g., to be used similar to a pilot signal in determining non-preferred resources or resources for which the UE experiences higher levels of interference. The determination of the non-preferred resources may be based on a frequency selectivity of the channel, interference, etc., as well as the measurements performed, at 508, on the plurality of transmissions received over time. The determination may be based on any of the aspects of machine learning, neural networks, or deep learning that are described in connection with FIG. 4, e.g., to output 412 information about the resources (e.g., at an RB level or a tone/RE level) that are less desirable for communication with the UE based on interference experienced at the UE, quality of reception at the UE, etc. In some aspects, the neural network, or a machine learning component, may output a set of resources (which may be referred to as worst resources) to avoid using for communication with the UE.

At 512, the UE may transmit an indication to the base station 504 of the time-frequency resources for the base station 504 to avoid utilizing for communicating with the UE 502. FIG. 4 similarly illustrates the UE 402 indicating, at 414, the resources to avoid for communication with the UE 402. In some aspects, the indication may comprise a request for the base station to not send control and/or data to the UE 502 on a given set of time and/or frequency resources.

At 514, the base station 504 may allocate, to another UE served by the base station 504, the time-frequency resources to be avoided for communicating with the UE 502. In further aspects, the base station 504 may perform power-boosting techniques on available tones in an OFDM symbol for DL transmissions. The base station 504 may also use the non-preferred resources as interference management resources (IMRs). At 516, the base station may transmit a signal to the UE 502 on different time-frequency resources from the time-frequency resources indicated at 512. FIG. 4 similarly illustrates that the second wireless device 404 may use the indication 414 to schedule communication with the UE 402, e.g., transmitting in resources that do not include the indicated resources and/or granting resources based on the information received from the UE 402.

At 518, the UE 502 may update the time-frequency resources to avoid utilizing for communications of the UE based on one or more SPS transmission cycles. At 520, the UE 502 may transmit an indication of the updated time-frequency resources for the base station 504 to avoid utilizing for communicating with the UE 502.

For different types of UL/DL reference signals, such as CSI-RS, DM-RS, SRS, tracking reference signal (TRS), phase tracking reference signal (PT-RS), etc., certain sets of resources may be defined for the UE 502 and the base station 504. Further, a corresponding energy per resource element (EPRE) may be associated with the sets for pilot tones of a reference signal. The known sets/patterns and corresponding EPREs enable the base station and/or UE to use the reference signals to perform measurements, such as channel estimations. In aspects, machine learning may be utilized by the UE 502 and/or the base station 504 to assist in a selection of resources for reference signals.

In some cases, the defined sets of the reference signals may not be configured to address the different conditions of a particular deployment environment of the UE 502. As presented herein, a machine learning component or neural network may be trained over time using the defined set of reference signals to determine a set of one or more reference signals for a particular environment (which may be referred to as a custom reference signal or an optimized reference signal). The custom reference signals may be different than the defined reference signals. For example, a first set of one or more reference signals may be determined for an indoor environment, and a different set of one or more reference signals may be determined for an outdoor environment. As another example, a first set of one or more reference signals may be determined for a cell edge environment, and a second set of one or more reference signals may be determined for an environment that is closer to the base station. Thus, the UE 502 may utilize a neural network to learn over time an improved reference signal (e.g., a DL reference signal) based on a deployment or environment of the UE. The UE may similarly learn, or determine, a power distribution for the reference signals based on a placement pattern. Machine learning may be performed at the UE 502 and/or the base station 504 to execute training procedures based on the defined reference signals. Such training procedures may provide an improved/modified reference signal for certain deployment environments. The UE 502 may provide feedback to the base station 504 indicative of the modified reference signal, which may be used by the base station 504 in place of the defined reference signals.

In order to determine modified reference signals across time-frequency resources, both the UE 502 and the base station 504 may determine a same reference signal from the defined reference signals and the EPRE values for different reference signal tones across the time-frequency resources. In some cases, the modified reference signals may not be regular/periodic, such as for groups of UEs associated with an RB. Based on machine learning, the UE 502 may determine an improved/modified reference signal that may be indicated to the base station 504 for implementation.

A neural network (e.g., at the UE 502) may learn the resources to be used for improving reference signal pilot allocations and improving power distribution techniques. For instance, the UE 502 may learn the particular time-frequency resources that cause decreased performance (e.g., due to interference or other causes) and transmit a request to the base station 504 to schedule DL reference signals on different resources from the resources that cause the decreased performance. The request from the UE 502 may be associated with the frequency domain (e.g., tones) and/or the time domain. The UE 502 may determine the improved resources at an increased level of granularity via machine learning. For example, the UE 502 may determine the improved resources at the RB level or the tone level/RE level, where an RB may be associated with 12 REs and 14 OFDM symbols per RB. The UE 502 may determine one or more tones that cause the decreased performance and indicate the one or more tones to the base station 504, so that when the base station 504 determines a DL resource allocation for the UE 502, the base station 504 may determine to exclude the one or more tones indicated by the UE 502 as a cause of the decreased performance.

Industrial IoT (IIoT) applications may be based on semi-persistent scheduling (SPS), where data transmitted to the UE 502 may be periodic and repeated over a given time. If the UE 502 is located at a cell edge (e.g., within a range of a neighboring base station and a neighboring UE), overlapping time-frequency resources scheduled in the neighboring cell may cause inter-cell interfere to the UE 502. In cases of intra-cell interference, the base station 504 may be configured to manage resource allocations among a plurality of UEs that the base station 504 serves. That is, the base station 504 may determine resources that are allocated to a first UE and allocate non-overlapping resources to other UEs in the plurality of UEs. In order for the base station 504 to manage inter-cell interference, coordination may be needed among the base station 504 and the neighboring base station. As such coordination may not occur in some cases, the UE 502 may execute a machine learning algorithm to learn the resources on which the neighboring UE may be scheduled in the adjacent cell. The UE 502 may learn the resources over time based on the traffic being periodic. For example, after 20 SPS iterations/cycles the UE 502 may learn the resources that may cause interference to the UE 502 and indicate the resources to the base station 504. The base station 504 may determine to exclude the use of such resources for DL transmission to the UE 502.

Additionally, or alternatively, to determining a custom reference signal, in aspects, the UE 502 may request (e.g., signal) the base station 504 to not send control information and/or data on the particular set of time-frequency resources determined via the machine learning algorithm to be non-preferred resources. A neural network module at the UE 502 may be configured to learn the time and/or frequency resources that may be associated with higher levels of interference at the UE 502. The interference may be from the neighboring/adjacent cell, for example. Hence, the UE 502 may provide feedback to the base station 504 indicative of the non-preferred resources, which may be associated with a request that the base station 504 refrains from using the non-preferred resources for control and/or data transmissions to the UE. Non-preferred resources may correspond to tones measured by the UE 502 to have decreased performance in the time and/or frequency domains. The non-preferred resources may be based on an irregular rate-matching pattern for the UE 502. When the base station 504 determines to send data to the UE 502, the base station 504 may rate match the control or data around the resources indicated by the UE. Thus, the base station may rate match around the resources that the UE indicates have poor reception at the UE, which may improve reception at the UE. For example, the base station 504 may rate match a PDSCH around the non-preferred resources for the UE. Likewise, when receiving the PDSCH, the UE may perform de-rate matching around the non-preferred resources. If a subset of the resources is determined by the UE 502 to be included in the non-preferred resources, the base station 504 may rate match the subset of resources.

Wideband CQI reporting by the UE 502 may be utilized to indicate a CQI to the base station 504 for a set of subbands. With more granularity, subband CQI reporting techniques may provide measurements at a subband level. A subband may include a number consecutive RBs. For example, a set of 4 or 8 consecutive RBs in the frequency domain may correspond to a subband. To provide still further granularity, the UE 502 may be configured to recommend/signal the base station 504 to exclude a set of frequency resources at an RB level or a tone level/RE level. For example, the UE 502 may indicate that tone 1, tone 2, tone 3, etc., provide a threshold level of performance, but that decreased performance occurs at OFDM symbols 4-8, such that the base station 504 may not transmit on the corresponding resources.

Increased granularity may provide further flexibility in regard to resource boundaries. For example, with less granularity, the CQI reporting may need to be performed at the subband level if the RBs are not contiguous. For subband CQI reporting, the UE 502 may report the CQI for a given subband, which may correspond to a contiguous set of RBs. However, if the UE 502 is configured to signal non-preferred tones/RBs (e.g., RB 1, RB 4, RB 8, etc.) to the base station 504, increase performance may be provided. That is, the UE 502 may indicate a quality of non-contiguous RBs for the base station 504 to excludes, rather than consecutive sets of RBs that correspond to subbands, which may not have flexible boundaries. For instance, if subband 1 corresponds to RBs 1-4 and the UE 502 signals the base station 504 to refrain from transmitting on RBs 3-6, such RBs may be located in two different subbands (e.g., subband 1 and subband 2). The UE 502 may also be configured to signal the base station 504 to exclude resources at the tone level. For instance, the UE 502 may request the base station 504 to not send control/data on tone 1, tone 4, tone 8, etc. Similar to the RB level, the tones may be non-contiguous to provide boundary flexibility at the RB level. Signaling by the UE 502 at both the RB level and the tone level may be applied to the frequency domain and/or the time domain.

The UE 502 may provide the request/indication of the non-preferred resources to the base station 504 via PUCCH, MAC-control element (MAC-CE), or RRC. The UE 502 may also be configured to update the request at a later time. For example, an interferer in the adjacent cell may have relocated or may have rescheduled a transmission on a different resource, such that the resources scheduled for the UE 502 no longer overlap with the resources scheduled for the interferer. For SPS configurations (e.g., in IIoT applications), the UE 502 may learn a periodic interference pattern over time and decrease the inter-cell interference by requesting the serving base station 504 to not use the overlapping resources. The determination to not use the overlapping resources and/or to reschedule the transmission on a different set of resources may ultimately be determined by the base station 504, notwithstanding the request received from the UE 502.

If particular RBs or tones are determined to be non-preferred resources for sending control information or data, the UE 502 may be able to utilize the resources for other purposes or take advantage of potential benefits from the non-utilized resources. For example, power-boosting techniques may be performed on available tones in an OFDM symbol for DL transmissions. That is, if tone 1, tone 3, and tone 7 are excluded by the base station 504 for resource allocation, power-boosting techniques may be performed on each of the remaining/non-excluded tones in a corresponding OFDM symbol (e.g., symbol 1). In some cases, phase coherence may prevent power-boosting in the UL.

In another aspect, the non-preferred resources may be used by other UEs that are served by the base station 504 based on resource coordination techniques of the base station 504. The base station 504 may determine the other UEs based on disjointed sets of tones with the UE 502. Since the other UEs of the serving cell may be schedule with the non-preferred resources, the other UEs may be cell-centered UEs or UEs that may not be within the interference range of the adjacent interfering cell. The base station 504 may allocate the non-preferred resources to the other UEs or swap the resource allocations of the other UEs (e.g., the non-vulnerable UEs) with the cell edge UEs (e.g., the vulnerable UEs).

In a further aspect, the non-preferred resources may be used as IMRs. The base station 504 may schedule control information, data, or other information on a set of IMRs and the UE 502 may utilize the IMRs as zero power resources.

For example, while data may not be transmitted on the zero power resources, the UE 502 may use, e.g., zero power CSI-RS to perform an interference measurement. Accordingly, the UE 502 may use the non-preferred resources for interference measurement purposes even though the resources may not be allocated for explicit signaling.

Figure 6:
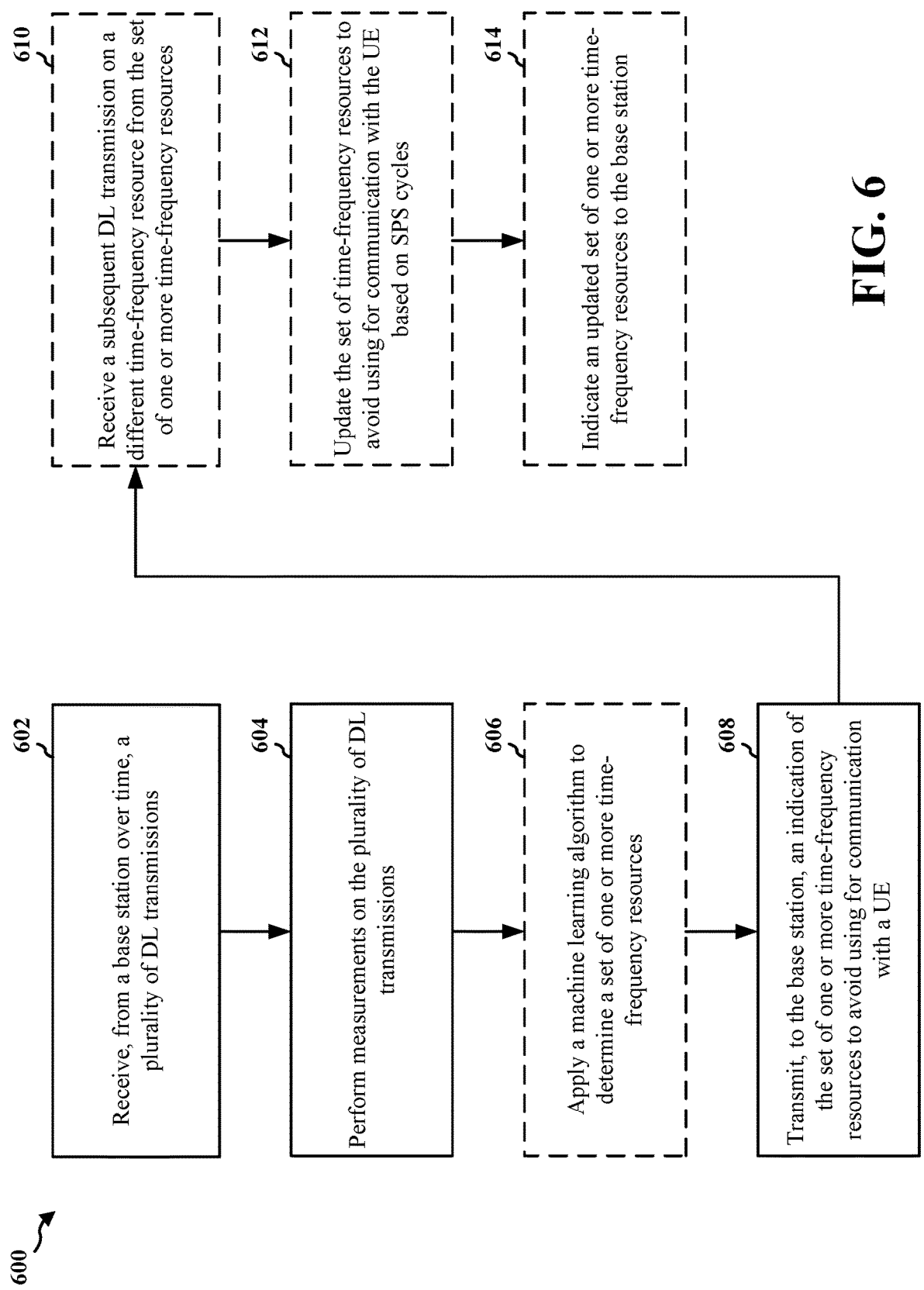
FIG. 6 is a flowchart of a method of wireless communication at a UE.

FIG. 6 is a flowchart 600 of a method of wireless communication. The method may be performed by a UE (e.g., the UE 104, 350, 402,502; the apparatus 802; etc.), which may include the memory 360 and which may be the entire UE 104/502 or a component of the UE 104/502, such as the TX processor 368, the RX processor 356, and/or the controller/processor 359. Optional aspects are illustrated with a dashed line. The method may improve reception of a received signal.

At 602, the UE may receive, from a base station over time, a plurality of DL transmissions. For example, referring to FIG. 5, the UE 502 may receive, at 506, a plurality of transmissions over time from the base station 504. The reception may be performed, e.g., by the reception component 830 of the apparatus 802.

At 604, the UE may perform measurements on the plurality of DL transmissions. For example, referring to FIG. 5, the UE 502 may perform, at 508, measurements on the plurality of transmissions received, at 506, from the base station 504. The performance may be performed, e.g., by the performance component 840 of the apparatus 802.

At 606, the UE may apply a machine learning algorithm to determine a set of one or more time-frequency resources. For example, referring to FIG. 5, the UE 502 may apply, at 510, a machine learning algorithm to determine time-frequency resource to avoid utilizing for communicating with the UE 502. The UE may apply a machine learning algorithm, neural network, and/or deep learning that includes any of the aspects described in connection with FIGS. 4 and 5. In aspects, the UE may apply, at 510, the machine learning algorithm over a plurality of SPS cycles to output the set of one or more time-frequency resources. The application may be performed, e.g., by the application component 842 of the apparatus 802.

At 608, the UE may transmit, to the base station, an indication of the set of one or more time-frequency resources to avoid using for communication with a UE. For example, referring to FIG. 5, the UE 502 may transmit, at 512, an indication of the time-frequency resources for the base station 504 to avoid utilizing for communicating with the UE 502. The UE 502 may indicate, at 512, the set of one or more time-frequency resources to the base station 504 as non-preferred resources.

In aspects, the measurements performed, at 508, may include interference measurements and the set of one or more time-frequency resources indicated, at 512, may be associated with a highest level of interference among the plurality of DL transmissions received at 506. The UE 502 may indicate, at 512, the set of one or more time-frequency resources for at least one of a set of one or more RBs or a set of one or more REs. The set of one or more time-frequency resources indicated, at 512, may in some cases include an irregular pattern.

The UE 502 may transmit, at 512, the indication to the base station 504 in at least one of a PUCCH transmission, a MAC-CE, or an RRC. The indication may include a request for the base station 504 to refrain from scheduling at least one of control information or data on the set of one or more time-frequency resources. The plurality of DL transmissions received, at 506, may include one or more reference signals and the UE 502 may measure interference based on the set of one or more time-frequency resources being a zero-power resource. The set of one or more time-frequency resources indicated, at 512, may include at least one of non-contiguous RBs or non-contiguous REs. The transmission may be performed, e.g., by the transmission component 834 of the apparatus 802.

At 610, the UE may receive a subsequent DL transmission on a different time-frequency resource from the set of one or more time-frequency resources. For example, referring to FIG. 5, the UE 502 may receive, at 516, a transmission from the base station 504 on different time-frequency resources from the time-frequency resources indicted, at 512, to the base station 504. A transmission power of the subsequent DL transmission (e.g., received at 516) may be increased for the different time-frequency resource. The reception may be performed, e.g., by the reception component 830 of the apparatus 802.

At 612, the UE may update the set of time-frequency resources to avoid using for communication with the UE based on SPS cycles. For example, referring to FIG. 5, the UE 502 may update, at 518, the time frequency resources to avoid utilizing for communication of the UE 502 based on SPS cycles. The updating may be performed, e.g., by the updater component 844 of the apparatus 802.

At 614, the UE may indicate an updated set of one or more time-frequency resources to the base station. For example, referring to FIG. 5, the UE 502 may indicate, at 520, the updated time-frequency resources for the base station 504 to avoid utilizing for communications with the UE 502. The indication may be performed, e.g., by the indication component 846 of the apparatus 802.

Figure 7:
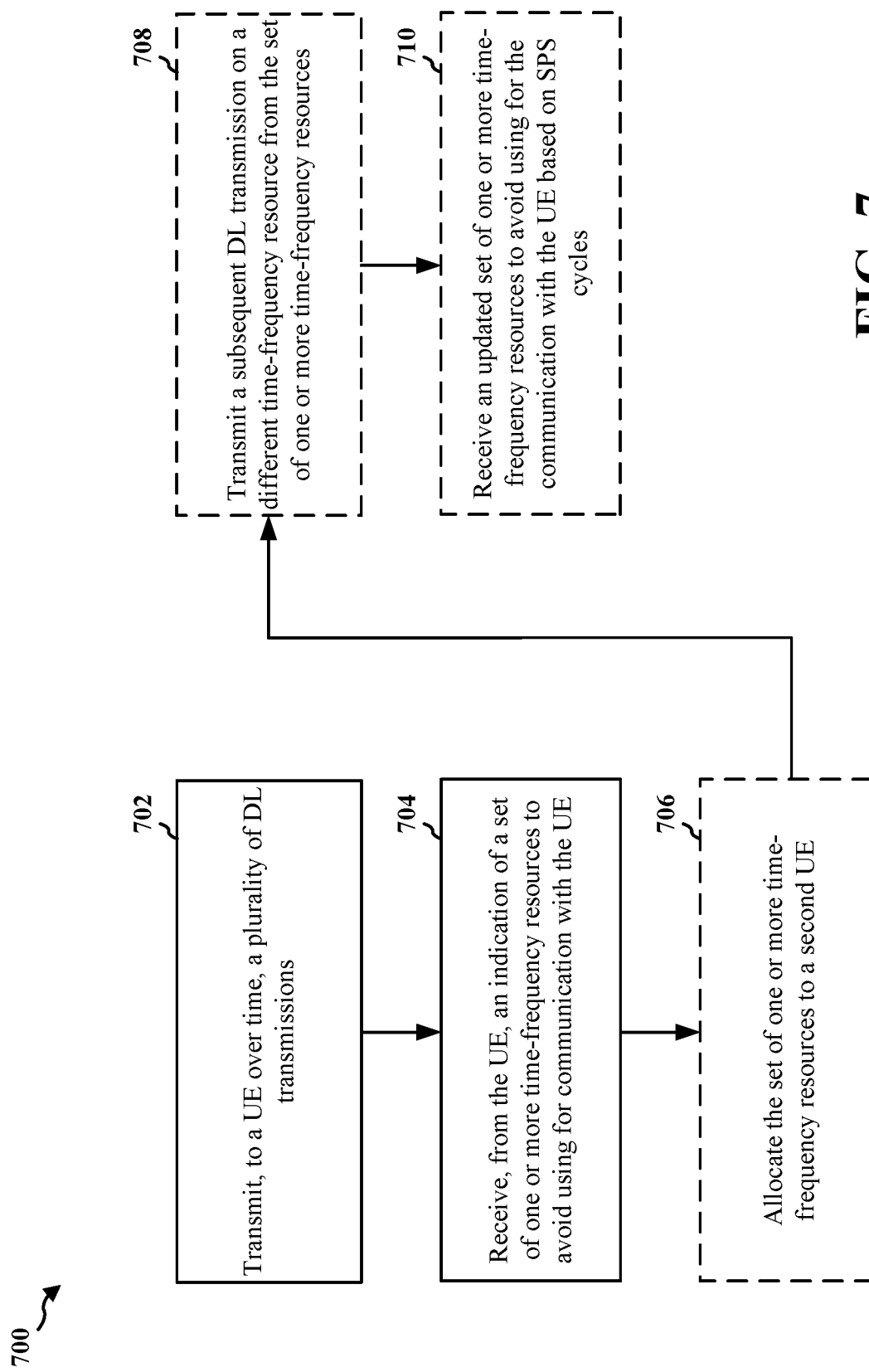
FIG. 7 is a flowchart of a method of wireless communication at a base station.

FIG. 7 is a flowchart 700 of a method of wireless communication. The method may be performed by a base station, e.g., the base station 102/504, which may include the memory 376 and which may be the entire base station 102/504 or a component of the base station 102/504, such as the TX processor 316, the RX processor 370, and/or the controller/processor 375. Optional aspects are illustrated with a dashed line. The method may improve reception of a transmitted signal.

At 702, the base station may transmit, to a UE over time, a plurality of DL transmissions. For example, referring to FIG. 5, the base station 504 may transmit, at 506, a plurality of transmissions over time to the UE 502. The plurality of DL transmissions (e.g., transmitted at 506) may occur over a plurality of SPS cycles. The transmission may be performed, e.g., by the transmission component 934 of the apparatus 902.

At 704, the base station may receive, from the UE, an indication of a set of one or more time-frequency resources to avoid using for communication with the UE. For example, referring to FIG. 5, the base station 504 may receive, at 512, an indication of time-frequency resources to avoid utilizing for communication with the UE 502. The base station 504 may receive the indication, at 512, of the set of one or more time-frequency resources as non-preferred resources by the UE 502. The set of one or more time-frequency resources indicated, at 512, may include an irregular pattern. The base station 504 may receive the indication, at 512, of the set of one or more time-frequency resources for at least one of a set of one or more RBs or a set of one or more REs. The set of one or more time-frequency resources received, at 512, may be indicated based on a machine learning algorithm, which may include any of the aspects described in connection with FIG. 4 or FIG. 5.

The base station 504 may receive the indication, at 512, from the UE 502 in at least one of a PUCCH transmission, a MAC-CE, or an RRC. The indication received, at 512, may include a request for the base station 504 to refrain from scheduling at least one of control information or data on the set of one or more time-frequency resources. The plurality of DL transmissions transmitted, at 506, may include one or more reference signals and the set of one or more time-frequency resources received, at 512, may include a zero-power resource. The set of one or more time-frequency resources received, at 512, may include at least one of non-contiguous RBs or non-contiguous REs. The reception may be performed, e.g., by the reception component 930 of the apparatus 902.

At 706, the base station may allocate the set of one or more time-frequency resources to a second UE. For example, referring to FIG. 5, the base station 504 may allocate, at 514, to another UE, the time-frequency resources to be avoided for communicating with the UE 502. The allocation may be performed, e.g., by the allocation component 940 of the apparatus 902.

At 708, the base station may transmit a subsequent DL transmission on a different time-frequency resource from the set of one or more time-frequency resources. For example, referring to FIG. 5, the base station 504 may transmit, at 516, a transmission to the UE 502 on different time-frequency resources from the time-frequency resources indicated, at 512, by the UE that are to be avoided for communicating with the UE 502. A transmission power of the subsequent DL transmission (e.g., transmitted at 516) may be increased for the different time-frequency resource. The transmission may be performed, e.g., by the transmission component 934 of the apparatus 902.

At 710, the base station may receive an updated set of one or more time-frequency resources to avoid using for the communication with the UE based on SPS cycles. For example, referring to FIG. 5, the base station 504 may receive, at 520, an indication of updated time-frequency resources from the UE 502 to avoid utilizing for communicating with the UE 502. The reception may be performed, e.g., by the reception component 930 of the apparatus 902.

Figure 8:
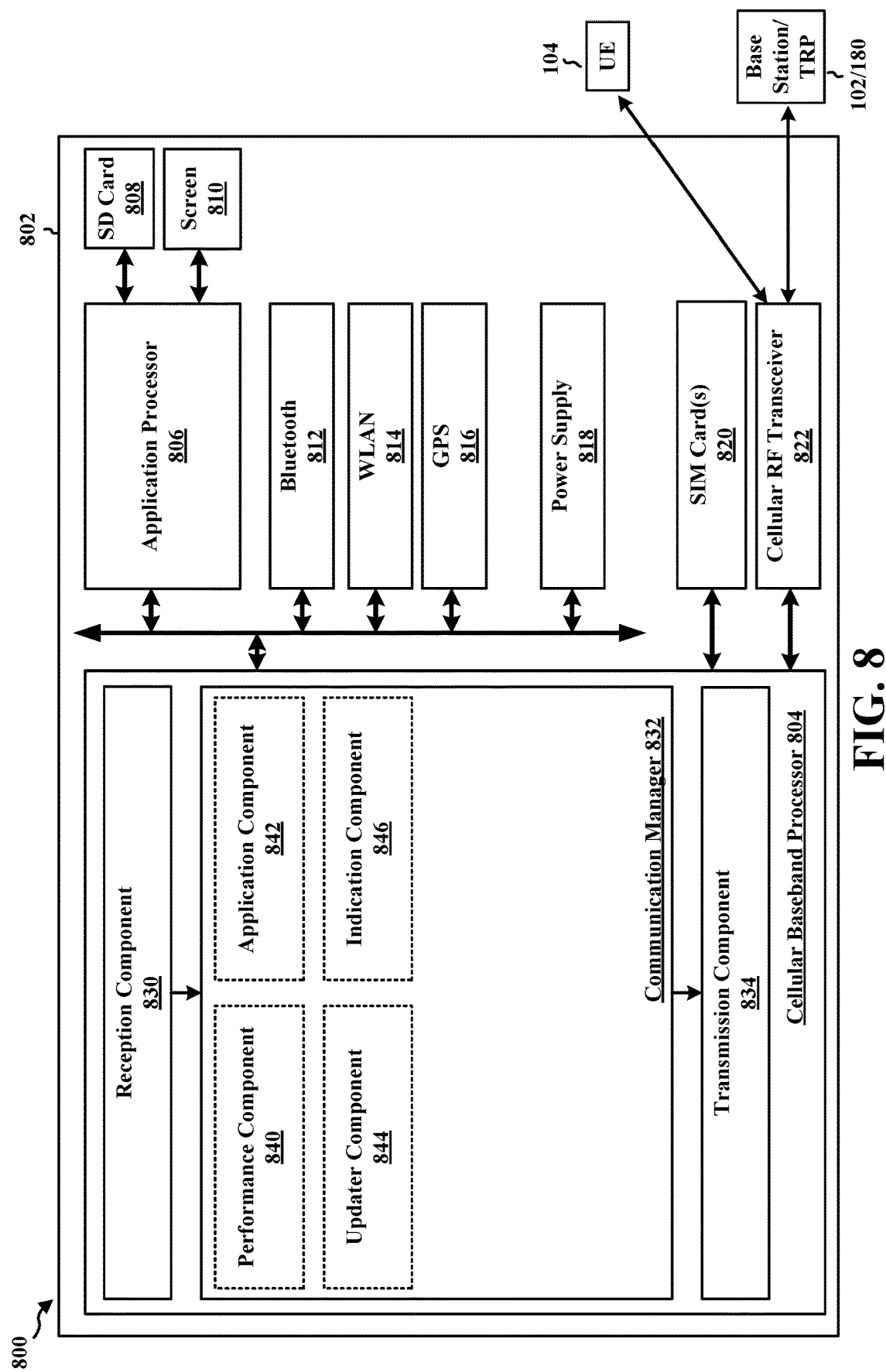
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the additional modules of the apparatus 802.

The reception component 830 is configured, e.g., as described in connection with 602 and 610, to receive, from a base station over time, a plurality of DL transmissions; and to receive a subsequent DL transmission on a different time-frequency resource from the set of one or more time-frequency resources. The communication manager 832 includes a performance component 840 that is configured, e.g., as described in connection with 604, to perform measurements on the plurality of DL transmissions. The communication manager 832 further includes an application component 842 that is configured, e.g., as described in connection with 606, to apply a machine learning algorithm to determine a set of one or more time-frequency resources. The communication manager 832 further includes an updater component 844 that is configured, e.g., as described in connection with 612, to update the set of time-frequency resources to avoid using for communication with the UE based on SPS cycles. The communication manager 832 further includes an indication component 846 that is configured, e.g., as described in connection with 614, to indicate an updated set of one or more time-frequency resources to the base station. The transmission component 834 is configured, e.g., as described in connection with 608, to transmit, to the base station, an indication of the set of one or more time-frequency resources to avoid using for communication with a UE.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for receiving, from a base station over time, a plurality of DL transmissions; means for performing measurements on the plurality of DL transmissions; and means for transmitting, to the base station, an indication of a set of one or more time-frequency resources to avoid using for communication with the UE. The apparatus 802 further includes means for applying a machine learning algorithm to determine the set of one or more time-frequency resources. The apparatus 802 further includes means for updating the set of time-frequency resources to avoid using for the communication with the UE based on further SPS cycles; and means for indicating an updated set of one or more time-frequency resources to the base station. The apparatus 802 further includes means for receiving a subsequent DL transmission on a different time-frequency resource from the set of one or more time-frequency resources.

The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
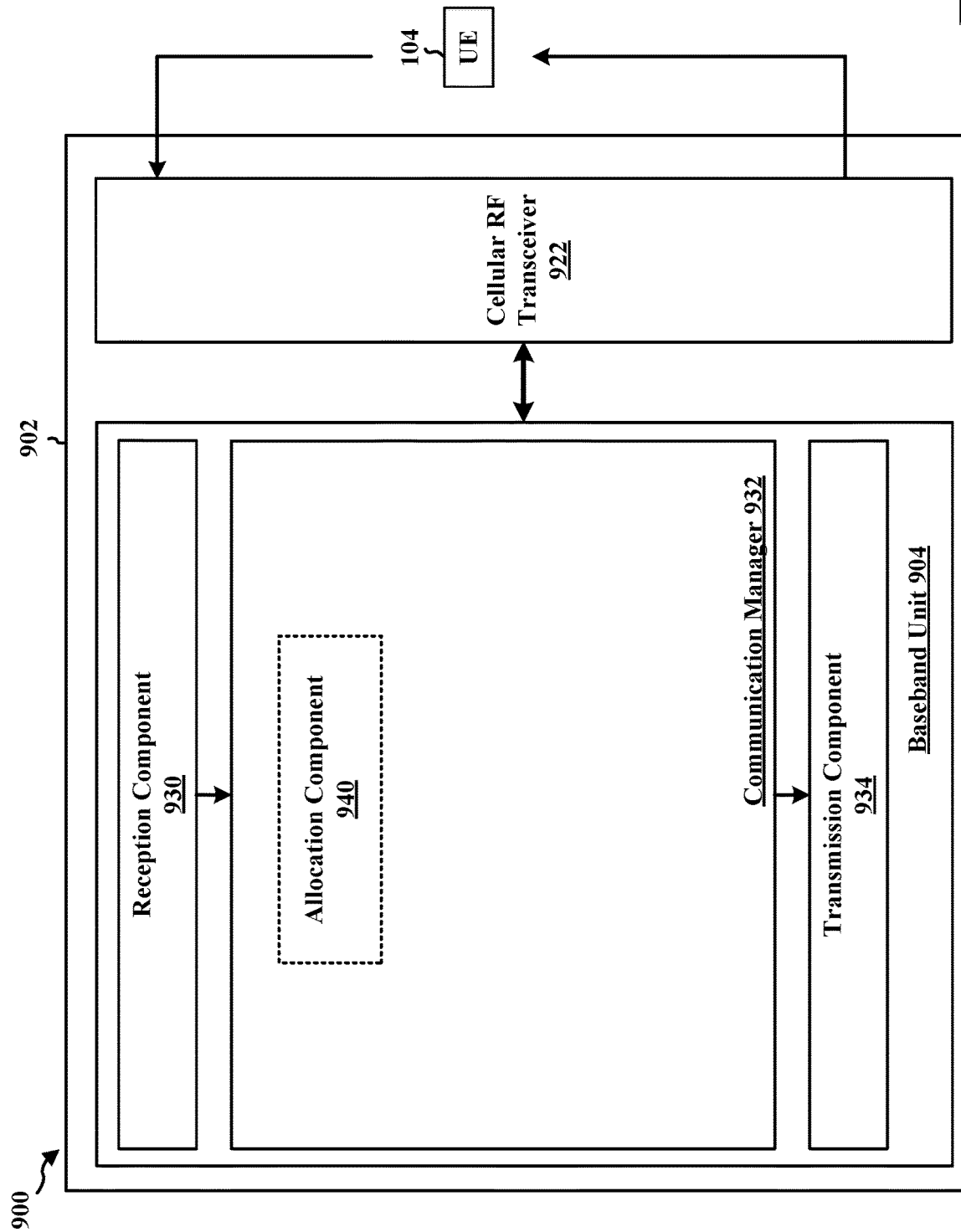
FIG. 9 is a diagram illustrating an example of a hardware implementation for an example apparatus.

FIG. 9 is a diagram 900 illustrating an example of a hardware implementation for an apparatus 902. The apparatus 902 is a BS and includes a baseband unit 904. The baseband unit 904 may communicate through a cellular RF transceiver 922 with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the BS 310 and may include the memory 376 and/or at least one of the TX processor 316, the RX processor 370, and the controller/processor 375.

The reception component 930 is configured, e.g., as described in connection with 704 and 710, to receive, from the UE, an indication of a set of one or more time-frequency resources to avoid using for communication with the UE; and to receive an updated set of one or more time-frequency resources to avoid using for the communication with the UE based on SPS cycles. The communication manager 932 includes an allocation component 940 that is configured, e.g., as described in connection with 706, to allocate the set of one or more time-frequency resources to a second UE. The transmission component 934 is configured, e.g., as described in connection with 702 and 708, to transmit, to a UE over time, a plurality of DL transmissions; and to transmit a subsequent DL transmission on a different time-frequency resource from the set of one or more time-frequency resources.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for transmitting, to a UE over time, a plurality of DL transmissions; and means for receiving, from the UE, an indication of a set of one or more time-frequency resources to avoid using for communication with the UE. The apparatus 902 further includes means for allocating the set of one or more time-frequency resources to a second UE. The apparatus 902 further includes means for receiving an updated set of one or more time-frequency resources to avoid using for the communication with the UE based on further SPS cycles. The apparatus 902 further includes means for transmitting a subsequent DL transmission on a different time-frequency resource from the set of one or more time-frequency resources.

The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: receiving, from a base station over time, a plurality of DL transmissions; and transmitting, to the base station, an indication of a set of one or more time-frequency resources to refrain from using for communication with the UE, the indication of the set of one or more time-frequency resources based at least in part on measurements performed on the plurality of DL transmissions.

Aspect 2 may be combined with aspect 1 and further includes indicating the set of one or more time-frequency resources to the base station as non-preferred resources.

Aspect 3 may be combined with any of aspects 1-2 and includes that the measurements include interference measurements, and wherein the set of one or more time-frequency resources have a highest level of interference among the plurality of DL transmissions.

Aspect 4 may be combined with any of aspects 1-3 and includes that the set of one or more time-frequency resources includes an irregular pattern.

Aspect 5 may be combined with any of aspects 1-4 and includes that the UE indicates the set of one or more time-frequency resources for at least one of a set of one or more RBs or a set of one or more REs.

Aspect 6 may be combined with any of aspects 1-5 and further includes applying a machine learning algorithm to determine the set of one or more time-frequency resources.

Aspect 7 may be combined with any of aspects 1-6 and further includes applying the machine learning algorithm over a plurality of SPS cycles to output the set of one or more time-frequency resources.

Aspect 8 may be combined with any of aspects 1-7 and further includes updating the set of time-frequency resources to refrain from using for the communication with the UE based on further SPS cycles; and indicating an updated set of one or more time-frequency resources to the base station.

Aspect 9 may be combined with any of aspects 1-8 and further includes transmitting the indication to the base station in at least one of a PUCCH transmission, a MAC-CE, or an RRC.

Aspect 10 may be combined with any of aspects 1-9 and includes that the indication includes a request for the base station to refrain from scheduling at least one of control information or data on the set of one or more time-frequency resources.

Aspect 11 may be combined with any of aspects 1-10 and further includes receiving a subsequent DL transmission on a different time-frequency resource from the set of one or more time-frequency resources.

Aspect 12 may be combined with any of aspects 1-11 and includes that a transmission power of the subsequent DL transmission is increased for the different time-frequency resource.

Aspect 13 may be combined with any of aspects 1-12 and includes that the plurality of DL transmissions includes one or more reference signals and the UE measures interference based at least in part on the set of one or more time-frequency resources being a zero-power resource.

Aspect 14 may be combined with any of aspects 1-13 and includes that the set of one or more time-frequency resources includes at least one of non-contiguous RBs or non-contiguous REs.

Aspect 15 is a method of wireless communication at a base station, comprising: transmitting, to a UE over time, a plurality of DL transmissions; and receiving, from the UE, an indication of a set of one or more time-frequency resources to refrain from using for communication with the UE.

Aspect 16 may be combined with aspect 15 and further includes receiving the indication of the set of one or more time-frequency resources from the UE as non-preferred resources.

Aspect 17 may be combined with any of aspects 15-16 and includes that the set of one or more time-frequency resources includes an irregular pattern.

Aspect 18 may be combined with any of aspects 15-17 and further includes allocating the set of one or more time-frequency resources to a second UE.

Aspect 19 may be combined with any of aspects 15-18 and further includes receiving the indication of the set of one or more time-frequency resources for at least one of a set of one or more RBs or a set of one or more REs.

Aspect 20 may be combined with any of aspects 15-19 and includes that the set of one or more time-frequency resources is based on a machine learning algorithm.

Aspect 21 may be combined with any of aspects 15-20 and includes that the plurality of DL transmissions occurs over a plurality of SPS cycles.

Aspect 22 may be combined with any of aspects 15-21 and further includes receiving an updated set of one or more time-frequency resources to refrain from using for the communication with the UE based on further SPS cycles.

Aspect 23 may be combined with any of aspects 15-22 and further includes receiving the indication from the UE in at least one of a PUCCH transmission, a MAC-CE, or an RRC.

Aspect 24 may be combined with any of aspects 15-23 and includes that the indication includes a request for the base station to refrain from scheduling at least one of control information or data on the set of one or more time-frequency resources.

Aspect 25 may be combined with any of aspects 15-24 and further includes transmitting a subsequent DL transmission on a different time-frequency resource from the set of one or more time-frequency resources.

Aspect 26 may be combined with any of aspects 15-25 and includes that a transmission power of the subsequent DL transmission is increased for the different time-frequency resource.

Aspect 27 may be combined with any of aspects 15-26 and includes that the plurality of DL transmissions includes one or more reference signals and the set of one or more time-frequency resources includes a zero-power resource.

Aspect 28 may be combined with any of aspects 15-27 and includes that the set of one or more time-frequency resources includes at least one of non-contiguous RBs or non-contiguous REs.

Aspect 29 is an apparatus for wireless communication including at least one processor coupled to a memory and configured to implement a method as in any of aspects 1-14.

Aspect 30 is an apparatus for wireless communication including means for implementing a method as in any of aspects 1-14.

Aspect 31 is a non-transitory computer-readable storage medium storing computer executable code, the code when executed by at least one processor causes the at least one processor to implement a method as in any of aspects 1-14.

Aspect 32 is an apparatus for wireless communication including at least one processor coupled to a memory and configured to implement a method as in any of aspects 15-28.

Aspect 33 is an apparatus for wireless communication including means for implementing a method as in any of aspects 15-28.

Aspect 34 is a non-transitory computer-readable storage medium storing computer executable code, the code when executed by at least one processor causes the at least one processor to implement a method as in any of aspects 15-28.

What is claimed is:

1. A method of wireless communication at a user equipment (UE), comprising:
   receiving, from a network over time, a plurality of downlink (DL) transmissions; and
   transmitting, to the network, an indication of a set of one or more time-frequency resources to refrain from using for communication with the UE, the indication of the set of one or more time-frequency resources based at least in part on measurements performed on the plurality of DL transmissions, wherein the set of one or more time-frequency resources is associated with communications of at least one UE that is different from the UE, and wherein the set of one or more time-frequency resources indicates a set of tones and a set of energy per resource element (EPRE) values for the set of tones.

2. The method of claim 1, further comprising indicating the set of one or more time-frequency resources to the network as non-preferred resources.

3. The method of claim 1, wherein the measurements include interference measurements, and wherein the set of one or more time-frequency resources have a highest level of interference among the plurality of DL transmissions.

4. The method of claim 1, wherein the set of one or more time-frequency resources includes an irregular pattern.

5. The method of claim 1, wherein the UE indicates the set of one or more time-frequency resources for at least one of a set of one or more resource blocks (RBs) or a set of one or more resource elements (REs).

6. The method of claim 1, further comprising applying a machine learning algorithm to determine the set of one or more time-frequency resources.

7. The method of claim 6, further comprising applying the machine learning algorithm over a plurality of semi-persistent scheduling (SPS) cycles to output the set of one or more time-frequency resources.

8. The method of claim 7, further comprising:
   updating the set of one or more time-frequency resources to refrain from using for the communication with the UE based on further SPS cycles; and
   indicating an updated set of one or more time-frequency resources to the network.

9. The method of claim 1, further comprising transmitting the indication to the network in at least one of a physical uplink control channel (PUCCH) transmission, a medium access control-control element (MAC-CE), or a radio resource control (RRC).

10. The method of claim 1, wherein the indication includes a request for the network to refrain from scheduling at least one of control information or data on the set of one or more time-frequency resources.

11. The method of claim 1, further comprising receiving a subsequent DL transmission on a different time-frequency resource from the set of one or more time-frequency resources.

12. The method of claim 11, wherein a transmission power of the subsequent DL transmission is increased for the different time-frequency resource.

13. The method of claim 11, wherein the different time-frequency resource does not include the set of tones.

14. The method of claim 1, wherein the plurality of DL transmissions includes one or more reference signals and the UE measures interference based at least in part on the set of one or more time-frequency resources being a zero-power resource.

15. The method of claim 1, wherein the set of one or more time-frequency resources includes at least one of non-contiguous resource blocks (RBs) or non-contiguous resource elements (REs).

16. The method of claim 1, wherein transmitting the indication of the set of one or more time-frequency resources comprises transmitting the indication in a channel quality indicator (CQI) report.

17. The method of claim 1, further comprising:
determining a custom reference signal based on a reference signal, the set of tones, and the set of EPRE values.

18. A method of wireless communication at a base station, comprising:
transmitting, over time, a plurality of downlink (DL) transmissions; and
receiving an indication of a set of one or more time-frequency resources to refrain from using for communication with a user equipment (UE), wherein the set of one or more time-frequency resources is associated with communications of at least one UE that is different from the UE, and wherein the set of one or more time-frequency resources indicates a set of tones and a set of energy per resource element (EPRE) values for the set of tones.

19. The method of claim 18, further comprising receiving the indication of the set of one or more time-frequency resources as non-preferred resources.

20. The method of claim 18, wherein the set of one or more time-frequency resources includes an irregular pattern.

21. The method of claim 18, further comprising allocating the set of one or more time-frequency resources to the at least one UE that is different from the UE.

22. The method of claim 18, further comprising receiving the indication of the set of one or more time-frequency resources for at least one of a set of one or more resource blocks (RBs) or a set of one or more resource elements (REs).

23. The method of claim 18, wherein the set of one or more time-frequency resources is based on a machine learning algorithm.

24. The method of claim 18, wherein the plurality of DL transmissions occurs over a plurality of semi-persistent scheduling (SPS) cycles.

25. The method of claim 24, further comprising receiving an updated set of one or more time-frequency resources to refrain from using for the communication with the UE based on further SPS cycles.

26. The method of claim 18, further comprising receiving the indication in at least one of a physical uplink control channel (PUCCH) transmission, a medium access control-control element (MAC-CE), or a radio resource control (RRC).

27. The method of claim 18, wherein the indication includes a request for the base station to refrain from scheduling at least one of control information or data on the set of one or more time-frequency resources.

28. The method of claim 18, further comprising transmitting a subsequent DL transmission on a different time-frequency resource from the set of one or more time-frequency resources.

29. The method of claim 28, wherein a transmission power of the subsequent DL transmission is increased for the different time-frequency resource.

30. The method of claim 28, wherein the different time-frequency resource does not include the set of tones.

31. The method of claim 18, wherein the plurality of DL transmissions includes one or more reference signals and the set of one or more time-frequency resources includes a zero-power resource.

32. The method of claim 18, wherein the set of one or more time-frequency resources includes at least one of non-contiguous resource blocks (RBs) or non-contiguous resource elements (REs).

33. The method of claim 18, wherein receiving the indication of the set of one or more time-frequency resources comprises receiving the indication in a channel quality indicator (CQI) report.

34. The method of claim 18, further comprising:
determining a custom reference signal based on a reference signal, the set of tones, and the set of EPRE values.

35. An apparatus for wireless communication at a user equipment (UE), comprising:
memory; and
one or more processors coupled to the memory and configured to cause the UE to:
receive, from a network over time, a plurality of downlink (DL) transmissions; and
transmit, to the network, an indication of a set of one or more time-frequency resources to refrain from using for communication with the UE, the indication of the set of one or more time-frequency resources based at least in part on measurements performed on the plurality of DL transmissions, wherein the set of one or more time-frequency resources is associated with communications of at least one UE that is different from the UE, and wherein the set of one or more time-frequency resources indicates a set of tones and a set of energy per resource element (EPRE) values for the set of tones.

36. The apparatus of claim 35, wherein the one or more processors are further configured to cause the UE to indicate the set of one or more time-frequency resources to the network as non-preferred resources.

37. The apparatus of claim 35, wherein the set of one or more time-frequency resources includes an irregular pattern.

38. The apparatus of claim 35, wherein the UE indicates the set of one or more time-frequency resources for at least one of a set of one or more resource blocks (RBs) or a set of one or more resource elements (REs).

39. The apparatus of claim 35, wherein the one or more processors are further configured to cause the UE to receive a subsequent DL transmission on a different time-frequency resource from the set of one or more time-frequency resources.

40. The apparatus of claim 39, wherein the different time-frequency resource does not include the set of tones.

41. The apparatus of claim 35, wherein to transmit the indication of the set of one or more time-frequency resources, the one or more processors are configured to cause the UE to transmit the indication in a channel quality indicator (CQI) report.

42. The apparatus of claim 35, wherein the one or more processors are further configured to:
   determine a custom reference signal based on a reference signal, the set of tones, and the set of EPRE values.

43. The apparatus of claim 35, wherein the one or more processors are configured, individually or in combination, to cause the UE to receive the plurality of DL transmissions and transmit the indication of the set of one or more time-frequency resources to refrain from using for communication with the UE.

44. An apparatus for wireless communication at a base station, comprising:
   memory; and
   one or more processors coupled to the memory and configured to cause the base station to:
     transmit, over time, a plurality of downlink (DL) transmissions; and
     receive an indication of a set of one or more time-frequency resources to refrain from using for communication with a user equipment (UE), wherein the set of one or more time-frequency resources is associated with communications of at least one UE that is different from the UE, and wherein the set of one or more time-frequency resources indicates a set of tones and a set of energy per resource element (EPRE) values for the set of tones.

45. The apparatus of claim 44, wherein the one or more processors are further configured to cause the base station to receive the indication of the set of one or more time-frequency resources as non-preferred resources.

46. The apparatus of claim 44, wherein the set of one or more time-frequency resources includes an irregular pattern.

47. The apparatus of claim 44, wherein the one or more processors are further configured to cause the base station to receive the indication of the set of one or more time-frequency resources for at least one of a set of one or more resource blocks (RBs) or a set of one or more resource elements (REs).

48. The apparatus of claim 44, wherein the one or more processors are further configured to cause the base station to transmit a subsequent DL transmission on a different time-frequency resource from the set of one or more time-frequency resources.

49. The apparatus of claim 48, wherein the different time-frequency resource does not include the set of tones.

50. The apparatus of claim 44, wherein to receive the indication of the set of one or more time-frequency resources, the one or more processors are configured to cause the base station to receive the indication in a channel quality indicator (CQI) report.

51. The apparatus of claim 44, wherein the one or more processors are further configured to:
   determine a custom reference signal based on a reference signal, the set of tones, and the set of EPRE values.

52. The apparatus of claim 44, wherein the one or more processors are configured, individually or in combination, to cause the base station to transmit the plurality of DL transmissions and receive the indication of the set of one or more time-frequency resources to refrain from using for communication with the UE.

53. A non-transitory computer-readable storage medium storing computer executable code at a user equipment (UE), the computer executable code, when executed by one or more processors, causes the UE to:
   receive, from a network over time, a plurality of downlink (DL) transmissions; and
   transmit, to the network, an indication of a set of one or more time-frequency resources to refrain from using for communication with the UE, the indication of the set of one or more time-frequency resources based at least in part on measurements performed on the plurality of DL transmissions, wherein the set of one or more time-frequency resources is associated with communications of at least one UE that is different from the UE, and wherein the set of one or more time-frequency resources indicates a set of tones and a set of energy per resource element (EPRE) values for the set of tones.

54. The non-transitory computer-readable storage medium of claim 53, wherein the computer executable code further causes the UE to receive a subsequent DL transmission on a different time-frequency resource from the set of one or more time-frequency resources.

55. The non-transitory computer-readable storage medium of claim 54, wherein a transmission power of the subsequent DL transmission is increased for the different time-frequency resource.

56. The non-transitory computer-readable storage medium of claim 54, wherein the different time-frequency resource does not include the set of tones.

57. The non-transitory computer-readable storage medium of claim 53, wherein to transmit the indication of the set of one or more time-frequency resources, the computer executable code causes the UE to transmit the indication in a channel quality indicator (CQI) report.

58. The non-transitory computer-readable storage medium of claim 53, wherein the computer executable code further causes the UE to determine a custom reference signal based on a reference signal, the set of tones, and the set of EPRE values.

59. A non-transitory computer-readable storage medium storing computer executable code at a base station, the computer executable code, when executed by one or more processors, causes the base station to:
   transmit, over time, a plurality of downlink (DL) transmissions; and
   receive an indication of a set of one or more time-frequency resources to refrain from using for communication with a user equipment (UE), wherein the set of one or more time-frequency resources is associated with communications of at least one UE that is different from the UE, and wherein the set of one or more time-frequency resources indicates a set of tones and a set of energy per resource element (EPRE) values for the set of tones.

60. The non-transitory computer-readable storage medium of claim 59, wherein the computer executable code further causes the base station to transmit a subsequent DL transmission on a different time-frequency resource from the set of one or more time-frequency resources.

61. The non-transitory computer-readable storage medium of claim 60, wherein a transmission power of the subsequent DL transmission is increased for the different time-frequency resource.

62. The non-transitory computer-readable storage medium of claim 60, wherein the different time-frequency resource does not include the set of tones.

63. The non-transitory computer-readable storage medium of claim 59, wherein to receive the indication of the set of one or more time-frequency resources, the computer executable code causes the base station to receive the indication in a channel quality indicator (CQI) report.

64. The non-transitory computer-readable storage medium of claim 59, wherein the computer executable code further causes the base station to determine a custom reference signal based on a reference signal, the set of tones, and the set of EPRE values.

\* \* \* \* \*